United States Patent
Coppelletti

[19]

[11] Patent Number: 6,161,475

[45] Date of Patent: Dec. 19, 2000

[54] CITRUS FRUIT SQUEEZING MACHINE, FOR INDUSTRIAL USE

[75] Inventor: Girolamo Coppelletti, Pessola Di Varsi', Italy

[73] Assignee: Ferrari S.D. S.R.L., Reggio Emilia, Italy

[21] Appl. No.: 09/363,660

[22] Filed: Jul. 21, 1999

[30] Foreign Application Priority Data

Jul. 21, 1998 [IT] Italy .................................. RE98A0076

[51] Int. Cl.⁷ ..................................................... B30B 9/02
[52] U.S. Cl. ........................ 100/213; 100/98 R; 100/108; 100/282
[58] Field of Search ..................................... 100/107, 108, 100/125, 213, 282, 283, 98 R

[56] References Cited

U.S. PATENT DOCUMENTS

| | | | |
|---|---|---|---|
| 2,649,730 | 8/1953 | Hait | 100/108 |
| 2,780,988 | 2/1957 | Belk et al. | 100/108 |
| 4,245,516 | 1/1981 | Day | 100/282 |
| 4,309,943 | 1/1982 | Larsen et al. | 100/108 |
| 4,700,620 | 10/1987 | Cross | 100/98 R |
| 4,922,814 | 5/1990 | Anderson et al. | 100/108 |
| 5,070,778 | 12/1991 | Cross et al. | 100/108 |
| 6,021,683 | 2/2000 | Doege et al. | 100/282 |

*Primary Examiner*—Peter Vo
*Assistant Examiner*—Louis L. Huynh

[57] ABSTRACT

A squeezing cycle with a relatively short first stage in which the fruit is loaded, and a longer second squeezing stage involving a relatively slow chamber volume reduction movement is disclosed. The machine possesses for the movable cup an operating mechanism including two wheels of equal diameter, of which the first wheel is fixed and the other wheel is driven and is engaged with the first wheel in such a manner as to roll along its pitch circle. The machine also includes a motor-driven member for gyrating the axis of the driven wheel by causing this to roll about the fixed wheel, and a crank mechanism connecting the driven wheel to the movable cup and having a crankpin which is carried by the driven wheel and has its center at a distance from the axis of the driven wheel which is less than or equal to the radius of the pitch circle of the driven wheel.

6 Claims, 7 Drawing Sheets

CITRUS FRUIT SQUEEZING MACHINE, FOR INDUSTRIAL USE

FIELD OF THE INVENTION

This invention relates to the industrial squeezing of fruit, particularly citrus fruit, to extract its juice and possibly its essential oils.

BACKGROUND OF THE INVENTION

Citrus fruit squeezing machines for industrial use have been known for many years, comprising basically two opposing cups defining a fruit squeezing chamber and movable relative to each other to copenetrate. To effect a fruit squeezing cycle, the two cups are made to approach each other in such a manner as to gradually reduce the volume of the squeezing chamber.

An example of these machines is illustrated in Italian Patent 1202508 of the FMC Corp.

Although the machine of the invention has some basic similarly with the preceding machines and with the cited patent in terms of the squeezing members which act directly on the fruit (cups, knives, etc.), it presents improvements with regard to the transmission of movement to the squeezing members.

For optimum operation, said members, and in particular the movable cup (generally the upper cup), have to undergo a squeezing cycle in the form of two stages having different characteristics, namely a first stage in which the fruit is loaded into the chamber, and a second stage in which squeezing is effected. The first stage must be relatively short, whereas the second stage must be longer and involves a relatively slow chamber volume reduction movement.

In the known art, to implement said stages a system is provided in which motion is transmitted by cams operating push rods acting on the movable cup.

A drawback of said system is its considerable bulk, weight and relatively costly manufacture. Moreover if the movement curves of the movable member are to be varied, it requires substitution of the cam, this being relatively costly and difficult.

SUMMARY OF THE INVENTION

An object of the invention is to provide a different system for transmitting motion to the movable cup, and possibly to the other movable members, which overcomes the aforedescribed drawbacks, ie which is much simpler, is of less costly construction, and enables the curves of the cycle to be varied by relatively simple action. This and further objects are attained by the invention as characterised in the claims.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 4A:
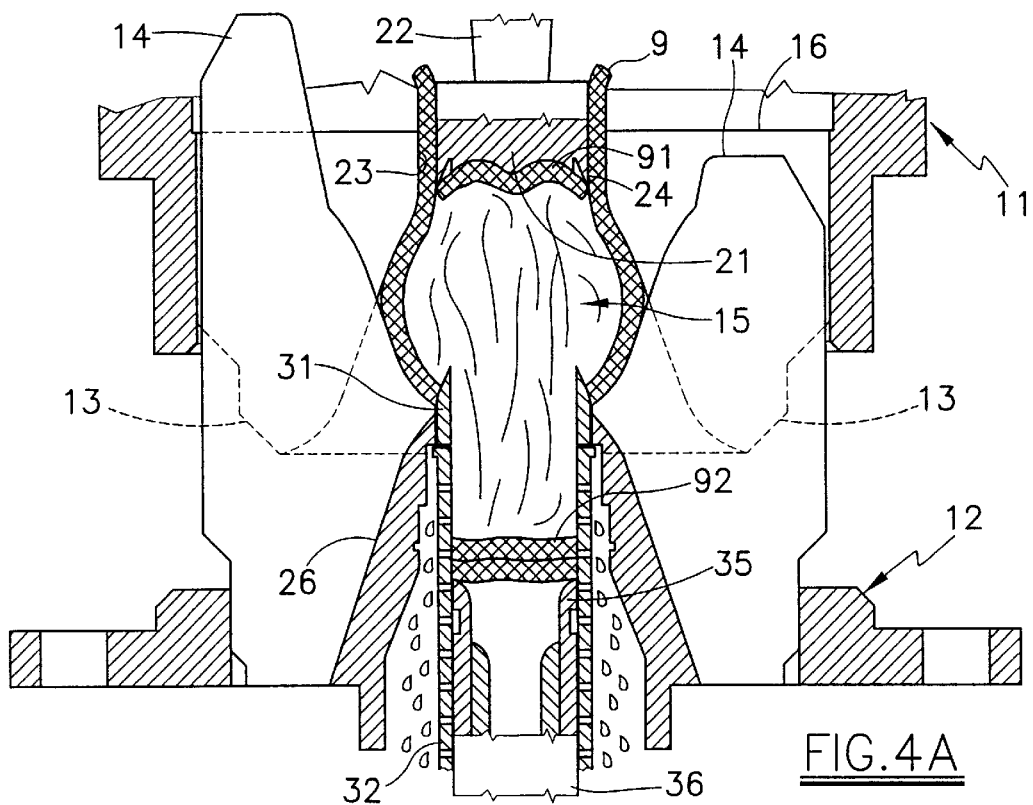
FIG. 4A shows the squeezing members in an initial moment during squeezing.
Figure 4B:
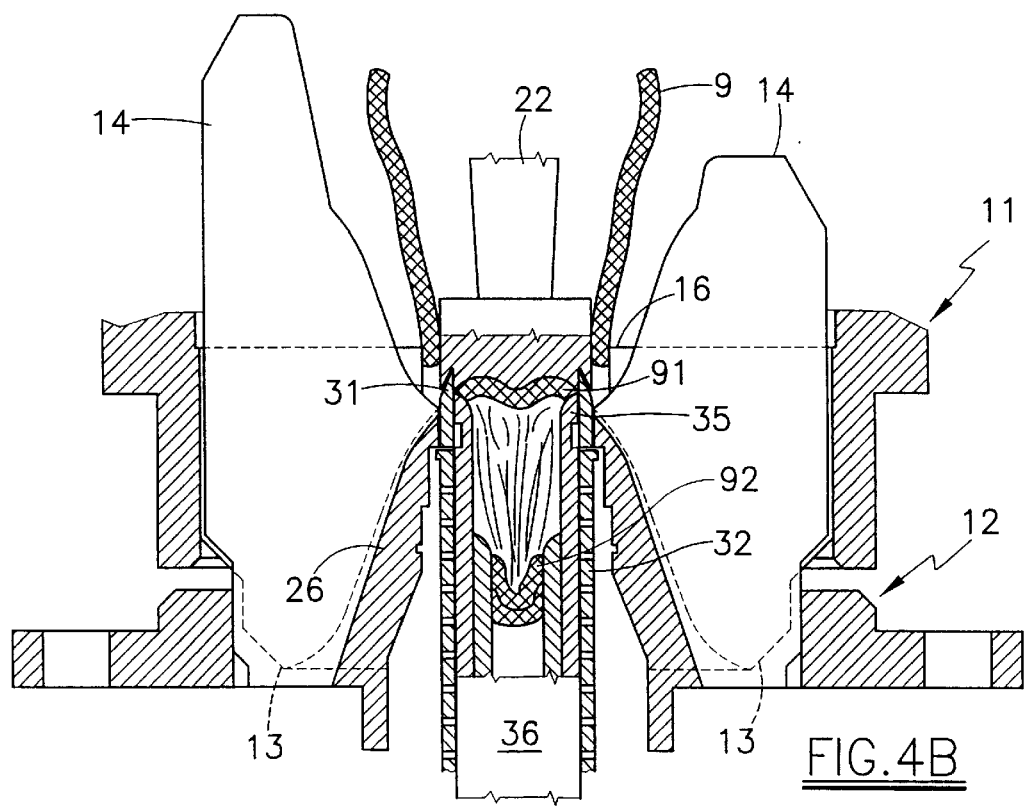
FIG. 4B shows the members of FIG. 4A in a final moment during squeezing.

The squeezing members are substantially of known type. These members are shown in FIGS. 4A and 4B.

Said members comprise an upper cup 11 and a lower cup 12. The upper cup 11 possesses a plurality of profiled plates 13 extending in an axial plane and spaced circumferentially apart, to define a downwardly facing overall hemispherical cavity. Likewise, the lower cup possesses a plurality of profiled plates 14 extending in an axial plane and spaced circumferentially apart to define an upwardly facing overall hemispherical cavity. The lower plates 14 are correlated with the plates 13 of the upper cup and are interlaced with these in such a manner that the overall spherical chamber produced by the hemispherical cavities decreases progressively in volume as the upper cup 11 moves downwards, while the lower cup 12 remains at rest. The upper cup 11 is provided with a circular knife 21 fixed to a vertical support rod 22 rigid with the upper unit, of which the upper (movable) cup forms part. The circular knife 21 is positioned within a circular aperture 23 having a vertical axis, bounded by the inner vertical sides of the upper plates 13, these sides being spaced from the vertical axis of the cups. The aperture 23 has a diameter greater than the diameter of the circular knife 21 in order to define an annular passage 24 which serves to expel the peel 9 of a citrus fruit subjected to squeezing.

The plates 14 of the lower cup 12 are rigid with a base element 26 the outer surface of which is shaped as an ogive with its point facing upwards.

In the interior of the base element 26 and diametrically opposite the upper knife 21 there is provided a fixed circular lower knife 31 projecting upwards from the inner surface of the lower cup 12, and fixed to the element 26. In the interior of the base element 26 there is provided in a fixed position a filtering tube 32 having a vertical axis, the upper end of which is positioned below the lower knife 31.

The filtering tube 32 is formed with a relatively thin wall having a plurality of apertures through which the juice flows out during the extraction process, to be collected in a juice collector (not shown in the figures). A scraper means 35 in the form of an opening cylindrical knife is positioned slidingly movable within the filtering tube 32. Said means 35 is carried at the upper end of a tubular element 36 slidable within the filtering tube 32.

Figure 6:
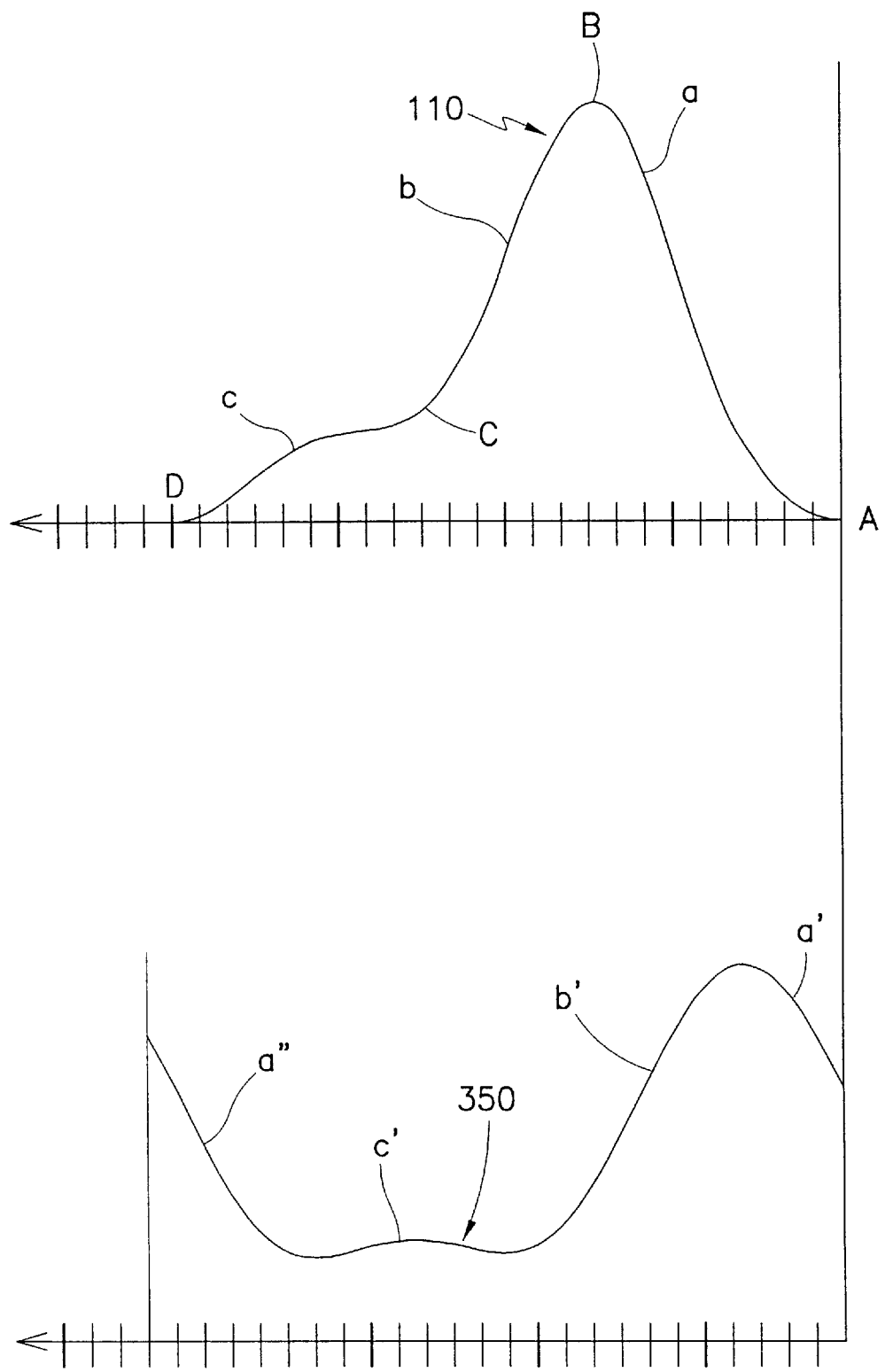
FIG. 6 is a graphic representation showing a cycle of movements produced on the movable cup and on the scraper member by the operating mechanisms of the invention.

The extraction cycle is described with the aid of the graphs of FIG. 6, which show the curve 111 of the movements (values along the vertical axis) effected during one cycle by the movable cup 11 plotted against its angular rotation (horizontal axis), and the curve 350 of the movements (values along the vertical axis) effected during one cycle by the scraper means 35, plotted against its angular rotation (horizontal axis).

At the commencement of the extraction cycle (point A), the two cups 11 and 12 having completely squeezed a fruit, the volume of the squeezing chamber 15 is at its minimum value (see FIG. 4B). During the first stage of the cycle (portions a and b of the curve 110), the upper cup 11 undergoes a fast rise (bringing it to its maximum withdrawal from the lower cup 12) followed by a rapid descent (portion b). Around the maximum-height point B the two cups are at their maximum distance apart, at which a fruit 8 to be squeezed is loaded into the chamber 15.

At the end of the fast descent portion b (point C), the upper cup 11 continues to descend more slowly, and the two cups 11 and 12 begin to compress the fruit 8, so reducing its volume. FIG. 4A shows an intermediate moment of the squeezing stage.

During the squeezing stage, the volume of the chamber 15 is gradually reduced until it reaches its minimum value (point D). During this stage, as is well known, the two knives 21 and 31 separate two discs from the peel of the fruit, namely an upper disc 91 which is trapped within the upper knife 21 and a lower disc 92 which is cut into the lower knife 31, to close the top of the tube 32. During the squeezing, the juice of the fruit is squeezed out through the lower aperture produced by the knife 31, the pressure of the juice pushing the lower disc 92 downwards to slide with a certain resistance into the cavity of the tube 32, and the juice leaving through the apertures in the tube 32 (see FIG. 4A).

Said stage (portion c) should be effected relatively gently, ie through a relatively large angular distance and at a slow speed. On termination of the compression (point D), a new cycle identical to the preceding commences.

During the final part of the compression stage and during the initial part of the rising stage of the cup 11, the scraper means 35 moves upwards to operate on the upper part of the filtering tube 32.

When the upper cup arrives at its lowest point D, the upper end of the lower knife 31 enters the upper knife 21 adjacent to it. In this manner the disc 91 passes from the upper knife 21 to the lower knife 31, to then remain attached thereto. When the squeezing stage takes place, the lower disc 92 and the upper disc 91 of the previously squeezed fruit are pushed downwards along the interior of the tubular element 36, together with the fibrous fruit residues (see FIG. 4B) and the juice is fed into a discharge chamber.

During the next descent of the means 35, the upper fruit disc 91 remains trapped by the means 35 and is lowered together with it. The fruit peel 9 is expelled upwards through the annular passage present about the upper knife 21 as the volume of the chamber 15 decreases, until it lies on a support surface 16 defined by the upper edge of the plates 13. On termination of compression the upper cup 11 is raised and lowered with rapid movement (lines a and b). This movement upwardly projects the separated peel 9, which is deviated sideways by an inclined baffle 17 and then removed.

In brief, to achieve optimum operation of the process together with a relatively high operating rate, the first stage of the squeezing cycle (portions a and b) must take place at relatively high speed to occupy a relatively small proportion of the cycle. in contrast, the squeezing stage (portion c) must take place gently and occupy a large proportion of the cycle.

For its part, the scraper means 35 must move along a particular curve 350 coordinated with the movements of the cup 11.

Specifically, the curve 350 comprises a first portion a' (during the first stage of the cycle) in which the scraper means 35 continues to rise (while the upper cup also rises) to operate on the highest part of the filtering tube 32, after which there follows a second portion b' in which the means 35 descends to withdraw from the movable cup 11, a third portion c' in which the means 35 remains at its maximum distance from the cup 11, and finally a fourth portion a" in which the means 35 again moves upwards.

The invention mainly regards a particular mechanism for operating the movable cup 11 in such a manner as to achieve a movement curve 110 having the described characteristics.

In practice, as can be seen in the embodiment illustrated in the figures, the machine comprises a number of identical squeezing members arranged to operate simultaneously on that number of pieces of fruit.

The upper cups 11 and the members rigid with them are carried by the respective support rods 22 which are fixed at their upper end to a vertically movable horizontal upper cross-member 41. The fixed cups 12 and the other fixed members connected thereto are carried by an intermediate fixed horizontal cross-member, and the tubular elements 36 carrying the means 35 are carried by a vertically movable lower horizontal cross-member 43. Two bushes 411 are fixed to the ends of the upper cross-member 41, and are slidable along two vertical lateral columns 44. Two bushes 431 are fixed to the ends of the lower cross-member 43, and are also slidable along the two columns 44.

In the upper part of the machine there are positioned close to its sides two identical but mutually specular mechanisms connected to the upper cross-member 41 to define a single mechanism for operating the upper cups 11 by driving the cross-member 41.

Figure 1:
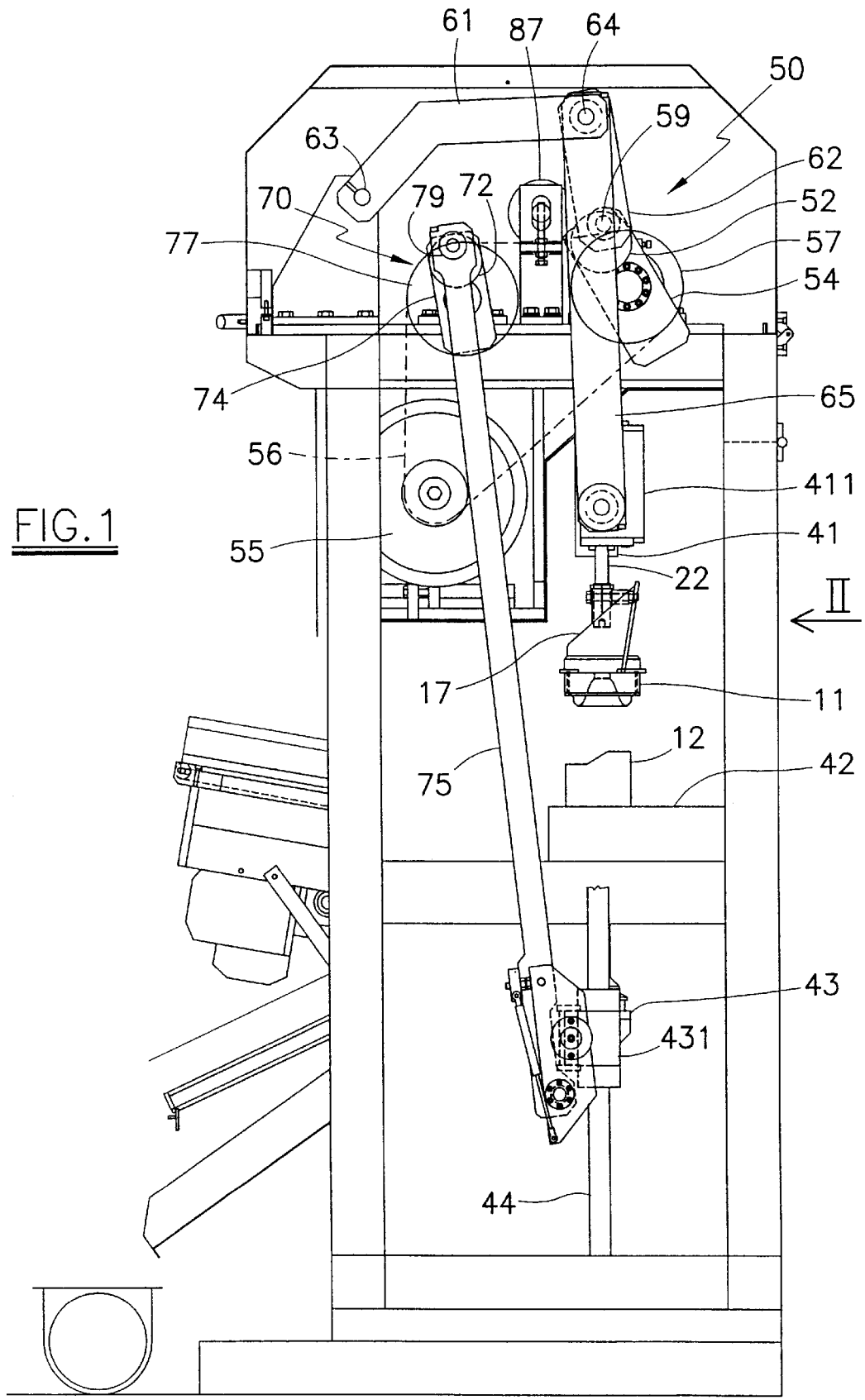
FIG. 1 is a vertical side elevation of the machine of the invention showing the operating mechanisms for the squeezing members.
Figure 2:
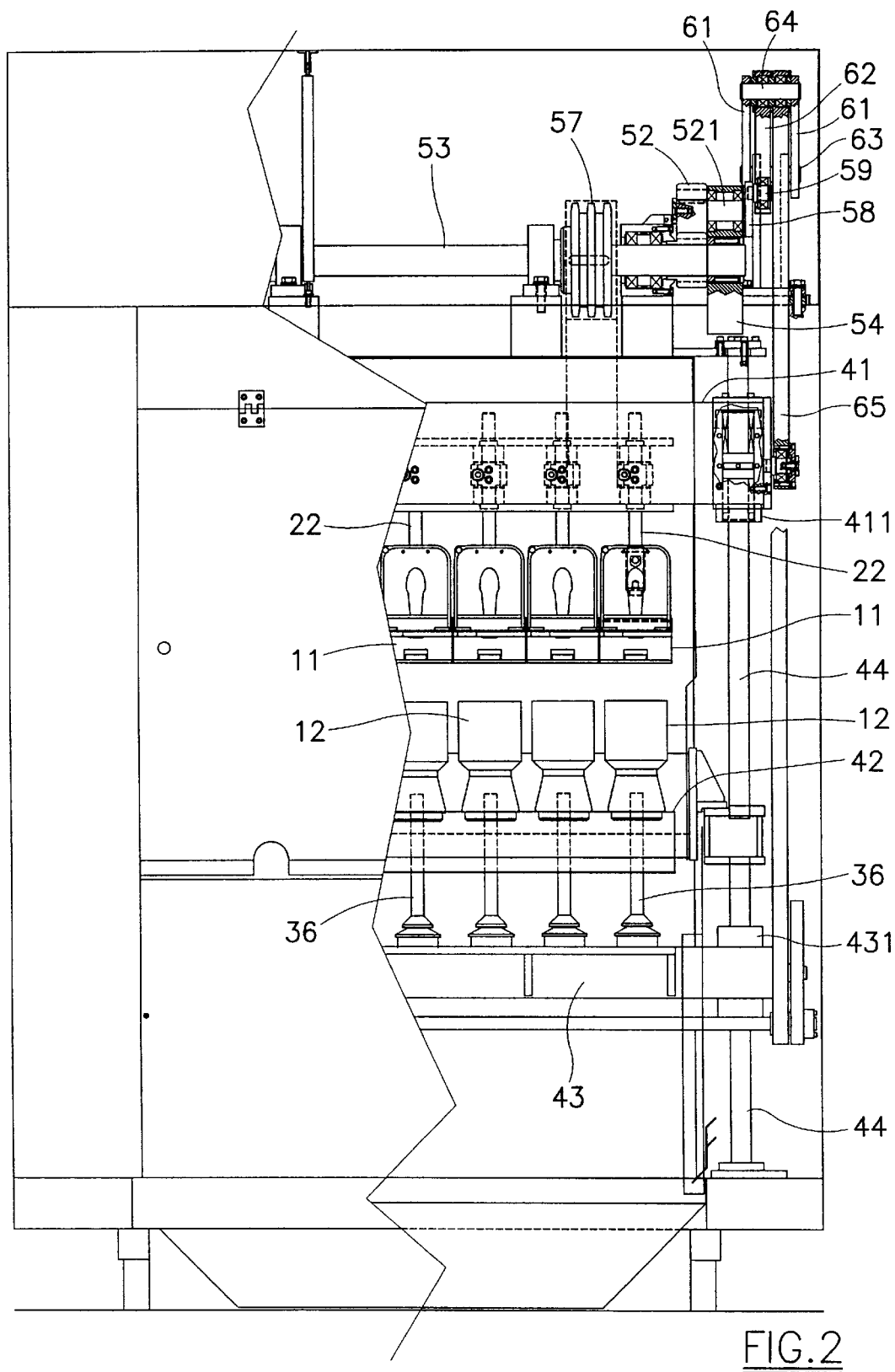
FIG. 2 is a side elevation in the direction of the arrow II of FIG. 1.
Figure 3:
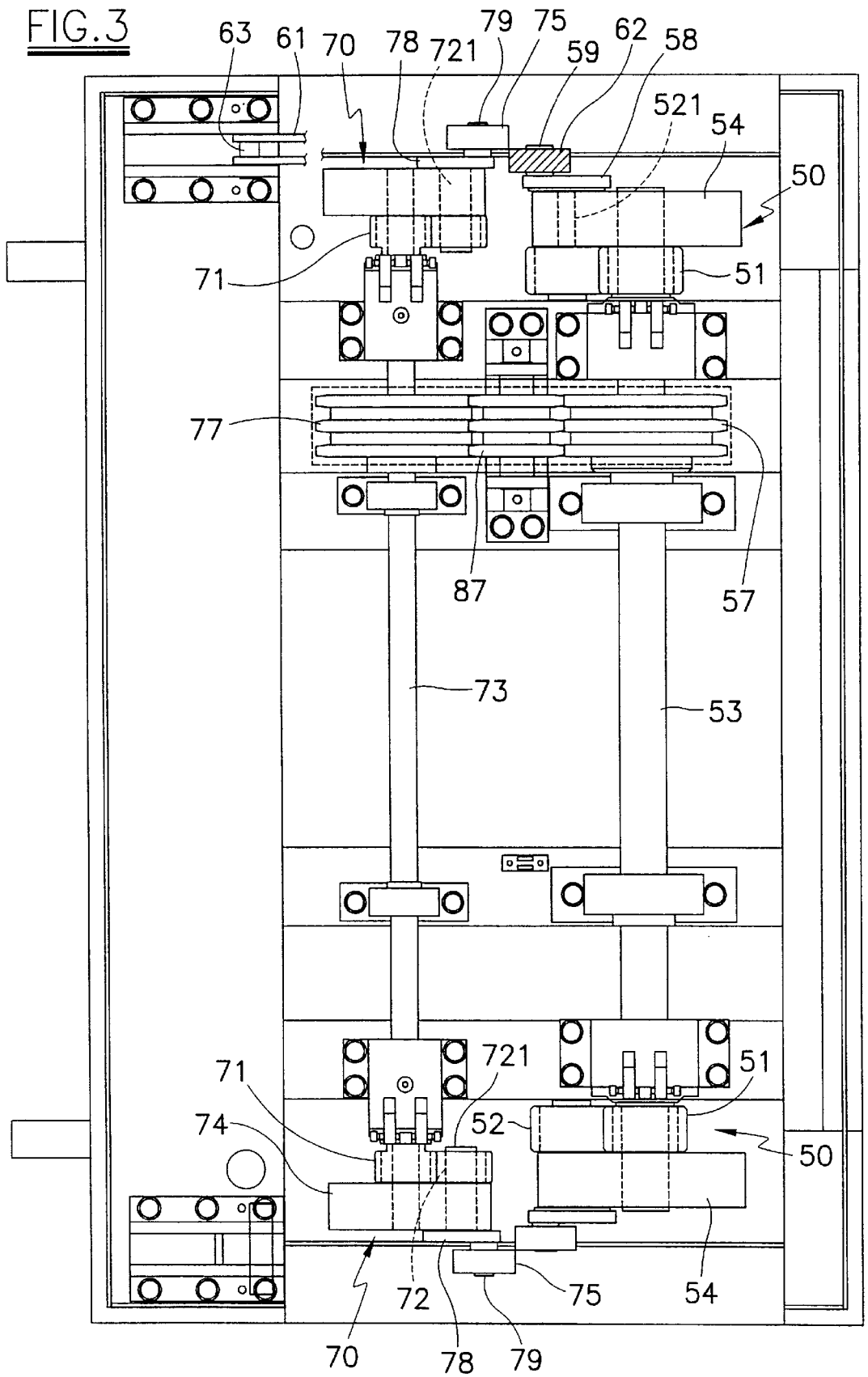
FIG. 3 is a top plan view of the machine of FIG. 1.

Each said lateral mechanism 50 comprises a fixed first wheel 51 traversed by a transverse shaft 53 common to the two mechanisms 50. At each end the shaft 53 carries a respective crank 54 (shown in FIGS. 1–3 but not in FIG. 4) which in a position eccentric to the axis of the shaft 53 carries a shaft 521 idly rotatable relative to the crank 54. A second wheel 52 is keyed on one end of the shaft 521. The two wheels 51 and 52 are both toothed, are of equal diameter and are mutually engaged such that the one rotates along the pitch circle of the other.

The entire operating mechanism is driven by a single geared motor 55, which transmits its motion to the shaft 53 via a chain 56 which engages a transmission sprocket 57 keyed on the shaft 53. The two driven wheels 52 are connected to the upper cross-member 41 by respective crank mechanisms. Each of these crank mechanisms comprises a crank 58 keyed onto the shaft 521 together with the wheel 52, and carrying a crankpin 59 the center of which lies at a distance from the axis of the driven wheel 52 which is (preferably) less than or at most equal to the radius of its pitch circle.

Each said crank mechanism also comprises a lever 61 (consisting of two parallel identical elements) substantially perpendicular to the trajectory of the movable cup (ie to the axis or the columns 44), and having a fixed end pivoted by a rotation pin 63 to the fixed frame of the machine, and a movable end pivoted by a pin 64 to a connecting rod 62, itself pivoted on said crankpin 59. By means of a second connecting rod 65 (or an equivalent means), the movable end of the lever 61 is connected to the cross-member 41, to transmit its movement to the movable cups 11.

The upper end of the connecting rod 65 is pivoted on the pin 64, and its lower end is pivoted to a respective end of the cross-member 41.

Figure 7A:
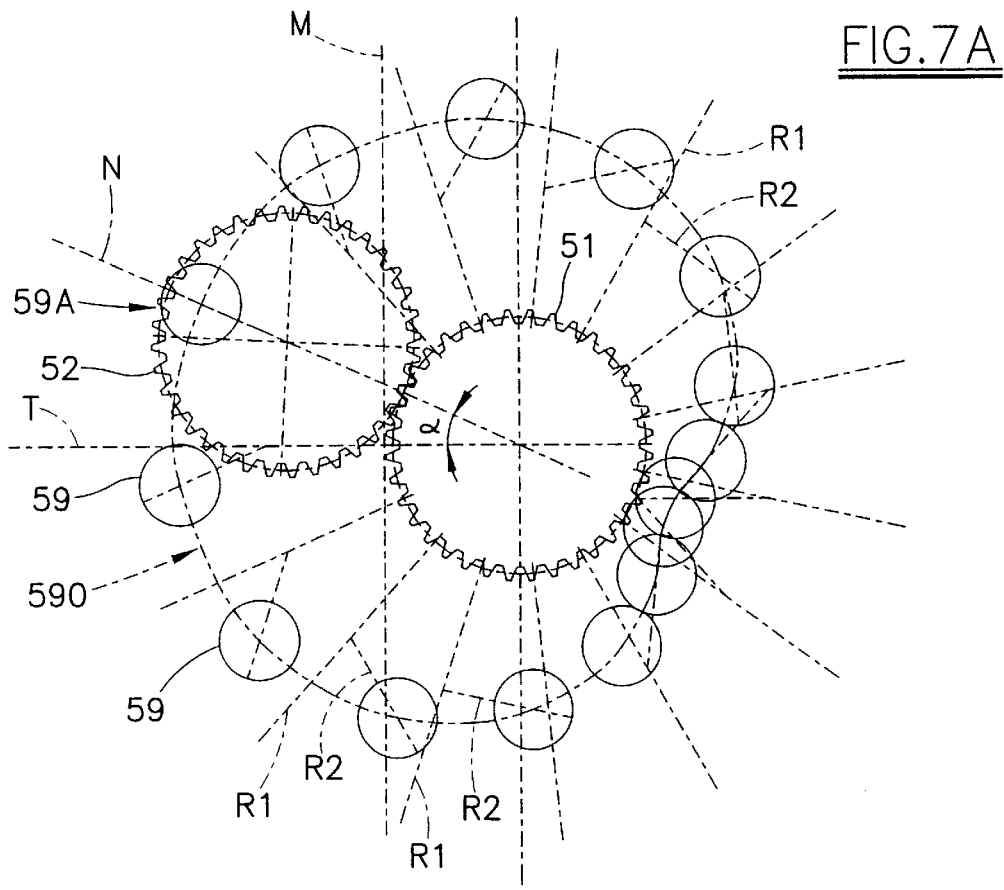
FIG. 7A is a schematic representation showing the different positions assumed by the crankpin 59 for a complete revolution of the wheel 52 about the fixed wheel 51.

In each lateral mechanism 50, rotating the shaft 53 causes the crank 54 to rotate. This causes the driven wheel 52 to gyrate by rolling on the wheel 51. This rolling causes the crankpin 59 to describe a particular epicycloid trajectory 590. FIG. 7A shows said trajectory 590 as the angular positions of the straight line (indicated by RI) passing through the centers of the wheels 51 and 52 vary. The different positions of the straight line R2 passing through the centers of the driven wheel 52 and crankpin 59 are also shown.

Figure 5:
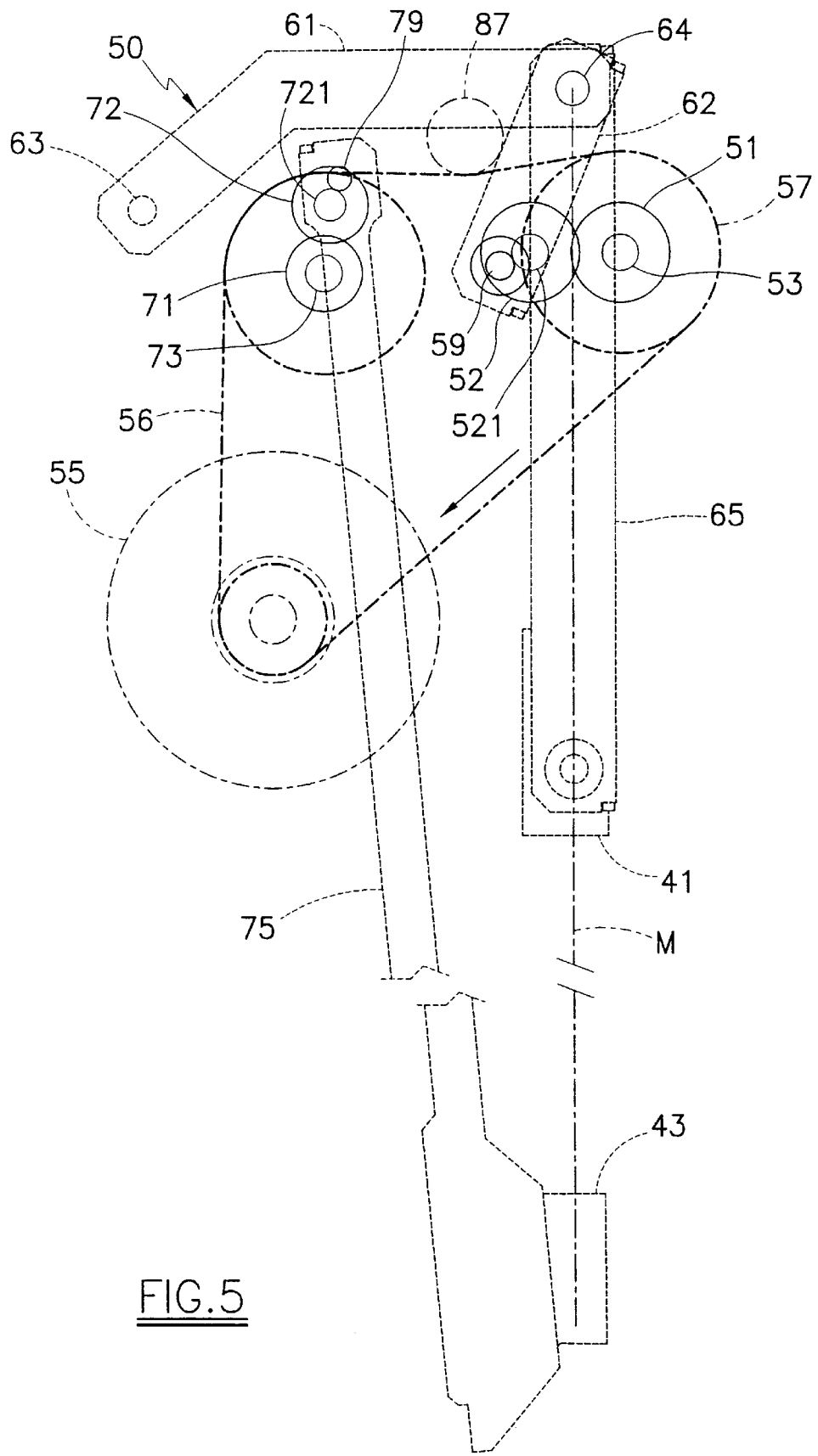
FIG. 5 is a schematic view of the basic members of the operating mechanisms.

The straight line which, in the lateral projection on a vertical plane (FIGS. 1 and 5), defines the trajectory of the movable cup 11, ie the vertical axis M of the columns 44, passes through an intermediate position between the centers of the two wheels 51 and 52. Moreover, the entire lever 61 and its movable end lie on one and the same side of the trajectory M, namely that on which the crankpin 59 lies when at its maximum distance from the center of the fixed wheel 51. This latter position, indicated by 59A, is shown in FIG. 7A, which shows the straight line N passing through the centers of the two wheels 51 and 52 and through the center of the crankpin 59 (when this is aligned with said centers).

Said straight line N is inclined upwards towards the side on which the crankpin 59 lies when this is at its maximum distance from the center of the first wheel 51 (position 59A), forming an angle $\alpha$ of 20–50 degrees to the horizontal line T.

By virtue of the described mechanism, the upper cross-member 41 and hence the upper cups 11 are driven with a cyclic movement (curve 110 of FIG. 6) which has all the characteristics required for an optimum result. Specifically: the first stage of the squeezing cycle (portions a and b) takes place at relatively high speed and with a sudden variation in direction (at point B) and occupies a relatively small proportion of the cycle; in contrast the squeezing stage (in particular the portion b) takes place gently over a larger proportion of the cycle.

The machine also comprises a second mechanism for driving the lower cross-member 43 carrying the scraper means 35, and is composed of two upper lateral mechanisms 70 connected together by a common transverse horizontal shaft 73 on which a transmission wheel 77 is keyed to receive movement from the chain 56 which also drives the shaft 53 of the other mechanisms 50. The wheel 77 has the same diameter as the wheel 57.

Each lateral mechanism 70 comprises a fixed first wheel 71 traversed by the transverse shaft 73. At each end the shaft 73 carries a respective crank 74 which in a position eccentric to the axis of the shaft 73 carries a shaft 721 idly rotatable relative to the crank 74. A second wheel 72 is keyed on one end of the shaft 721. The two wheels 71 and 72 are both toothed, are of equal diameters and are mutually engaged such that the one rotates along the pitch circle of the other.

The entire operating mechanism is driven by the single geared motor 55.

The two driven wheels 72 are connected to the lower cross-member 43 by respective crank mechanisms. Each of these crank mechanisms comprises a second crank 78 keyed onto the shaft 721 together with the wheel 7Z, and carrying a crankpin 79 the centre of which lies at a distance from the axis of the driven wheel 72 which is (preferably) less than or at most equal to the radius of its pitch circle.

Each said crank mechanism also comprises a connecting rod 75 pivoted at one end on the crankpin 79 and at its other end to the lower cross-member 43.

Figure 7B:
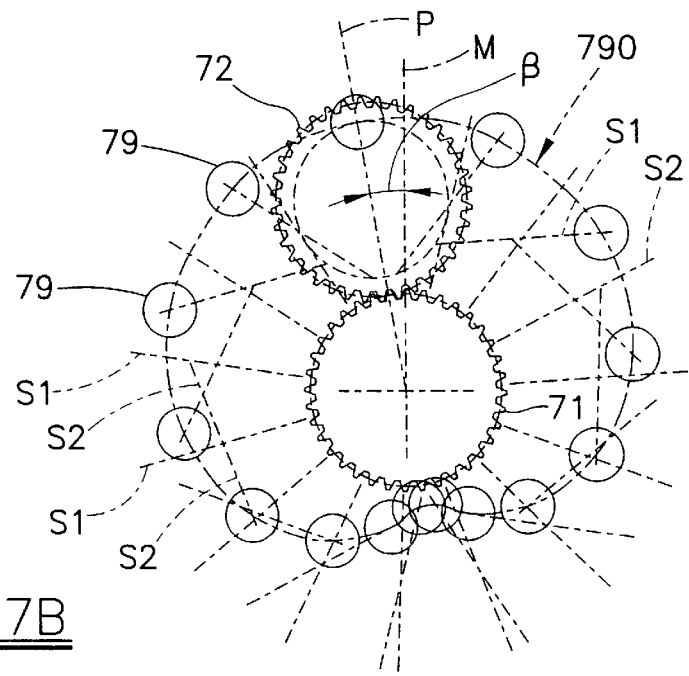
FIG. 7B is a schematic representation showing the different positions assumed by the crankpin 79 for a complete revolution of the wheel 72 about the fixed wheel 71.

In each lateral mechanism 70, rotating the shaft 73 causes the crank 74 to rotate. This causes the driven wheel 72 to gyrate by rolling on the wheel 71. This rolling causes the crankpin 79 to describe a particular epicycloid trajectory 790 (see FIG. 7B). Figure TB shows said trajectory 790 as the angular positions of the straight line (indicated by S1) passing through the centers of the wheels 71 and 72 vary. The different positions of the straight line S2 passing through the centers of the driven wheel 72 and crankpin 79 are also shown. When the pin 79 is in a determined position, indicated by 79A, its center and that of the wheels 71 and 72 are aligned along one and the same straight line P.

The straight line defining the trajectory of the scraper means 35, ie the vertical axis M of the columns 44, passes close to the center of the fixed wheel 71. In addition, the straight line P passing through the centers of the two wheels 71 and 72 and through the center of the crankpin 79 is inclined upwards towards the trajectory of the scraper means, to form an angle $\beta$ of 0–30 degrees to the vertical axis.

By virtue of the described mechanism, the lower cross-member 43 and hence the scraper means 315 are driven with a cyclic movement (curve 350 of FIG. 7) coordinated with the curve 110 of the movements of the movable cups 11, which has all the aforesaid characteristics required for an optimum result.

In an intermediate position between the two transmission wheels 57 and 77, there is provided an idle wheel 87 for tensioning the chain 56. The position of the wheel 87 can be adjusted, to adjust the phase synchronism between the mechanisms 50 and 70.

The invention attains all the results described in the introduction.

In particular, to vary the curve 110 only one of the elements of the drive mechanism needs to be changed, for example the connecting rod 62 or the lever 61.

Numerous modifications of a practical and applicational nature can be made to the invention, but without leaving the scope of the inventive idea as hereinafter claimed.

What is claimed is:

1. A fruit squeezing machine comprising opposing upper and lower cups defining a fruit squeezing chamber and movable relative to each other to mutually co-penetrate, to effect a fruit squeezing cycle by varying the volume of the squeezing chamber to implement a squeezing cycle comprising a first stage in which the fruit is loaded, and a second squeezing stage involving a relatively slow chamber volume reduction movement, a first operating mechanism for moving upper cup is provided, comprising:

a first wheel and a second wheel of equal diameter, of which the first wheel is fixed and the second wheel is driven and is engaged with the first wheel in such a manner as to roll along a first pitch circle, first motor-driven means for gyrating the axis of the second wheel by causing the second wheel to roll about the first wheel, and a first crank mechanism connecting the second wheel to the movable cup and having a first crankpin which is carried by the second wheel and has a center at a distance from the axis of the second wheel which is less than or equal to the radius of the pitch circle of the second wheel.

2. The machine as claimed in claim 1, in which the upper cup moves along a substantially straight-line trajectory, wherein said first crank mechanism comprises a lever substantially perpendicular to the trajectory of the upper cup and having a fixed end hinged on a fixed axis of rotation and a movable end hinged to a connecting rod that is hinged on said first crankpin, said movable end being connected to the upper cup by a second connector which transmits movement thereto.

3. The machine as claimed in claim 2, wherein a straight line (M) which defines the trajectory of the upper cup passes through an intermediate position between the centers of the first and second wheels, the entire lever and its movable end being positioned on one and the same side of said trajectory (M), namely that side on which the crankpin lies when at its maximum distance from the center of the first wheel.

4. The machine as claimed in claim 3, wherein a straight line (N) which passes through the centers of the first and second wheels and through the center of the first crankpin is inclined upwards towards a side on which the crankpin lies when at its maximum distance from the center of the first wheel to form an angle of 20–50 degrees with a horizontal line (T).

5. The machine as claimed in claim 1, comprising a movable upper cup and a fixed lower cup, an upper circular knife movable with the upper cup to cut a disc for the peel of the fruit, a lower circular knife positioned on the base of the lower cup at the upper end of a tube and a tubular scraper means movable within the tube relative to the fixed cup, and further comprising a second operating mechanism arranged to raise and lower the scraper means to and from a position in correspondence with the upper knife wherein said second operating mechanism comprises:

a third wheel and a fourth wheel of equal diameter, the third wheel is fixed and the other wheel is driven and is engaged with the third wheel in such a manner as to roll along a second pitch circle, second motor driven means for gyrating the axis of the second wheel by causing the driven wheel to roll about the third wheel and a second crank mechanism connecting the second wheel to the scraper means and having a second crankpin which is carried by the second wheel and has a center at a distance from the center of the second wheel which is less than or equal to the radius of the second pitch circle of the second wheel.

6. The machine as claimed in claim 5, in which the scraper means moves along a substantially straight-line trajectory (M), wherein said trajectory (M) of the scraper means passes close to the center of the third wheel, a straight line (P) passing through the centers of the third and fourth wheels and through the center of the second crankpin being inclined upwards towards the trajectory of the scraper means, to form an angle of 0–30 degrees to said trajectory (M).

* * * * *